(No Model.) 2 Sheets—Sheet 1.

C. COMSTOCK.
ROAD CART.

No. 438,345. Patented Oct. 14, 1890.

Witnesses:
Frank W. Warner.
N. E. C. Whitney

Inventor
Charles Comstock
By Joseph A. Minturn
Attorney (No Model.) 2 Sheets—Sheet 2.

C. COMSTOCK.
ROAD CART.

No. 438,345. Patented Oct. 14, 1890.

Witnesses:
Frank W. Warner
N. E. O. Whitney

Inventor.
Charles Comstock
By Joseph A. Minturn
Attorney.

UNITED STATES PATENT OFFICE.

CHARLES COMSTOCK, OF INDIANAPOLIS, INDIANA.

ROAD-CART.

SPECIFICATION forming part of Letters Patent No. 438,345, dated October 14, 1890.

Application filed March 29, 1890. Serial No. 345,904. (No model.)

*To all whom it may concern:*

Be it known that I, CHARLES COMSTOCK, a citizen of the United States, residing at Indianapolis, in the county of Marion and State of Indiana, have invented certain new and useful Improvements in Vehicles; and I do hereby declare the following to be a full, clear, and exact description of the invention, such as will enable others skilled in the art to which it appertains to make and use the same.

This invention relates to vehicles, and is especially intended as an improvement upon two-wheeled vehicles or road-carts; but parts of this improvement are applicable to buggies, wagons, &c., the object of the invention being to produce a road-cart which will be cheap to manufacture, strong, and durable; to so arrange and construct the seat that it may be turned over sidewise to permit the easy ingress and egress of persons from the rear, and to so construct and arrange the various parts of the vehicle that all horse-motion will be obviated and the vehicle rendered a very easy riding one.

With these objects in view the invention consists, in certain details of construction and in the combination and arrangement of the several parts of the vehicle, substantially as hereinafter described, and set forth in the claims.

Figure 1:
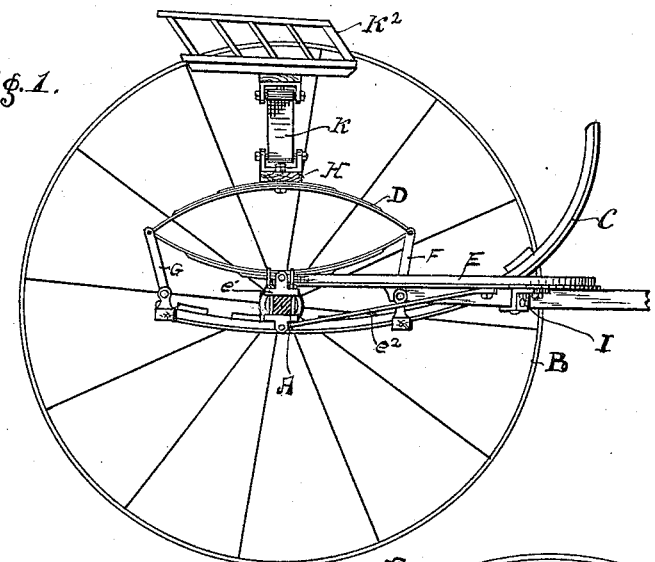
Figure 2:
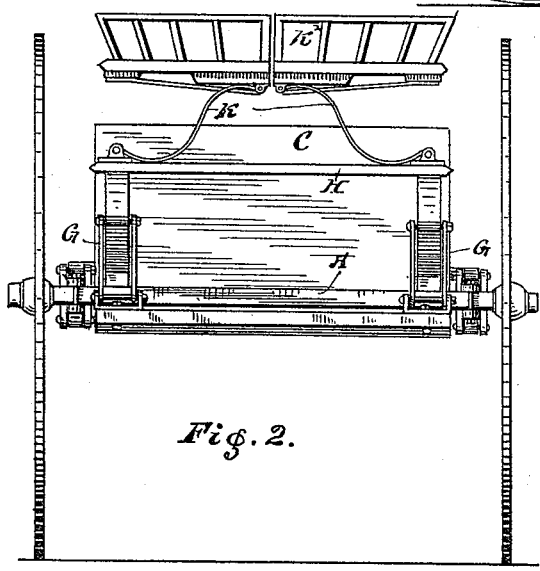
Figure 3:
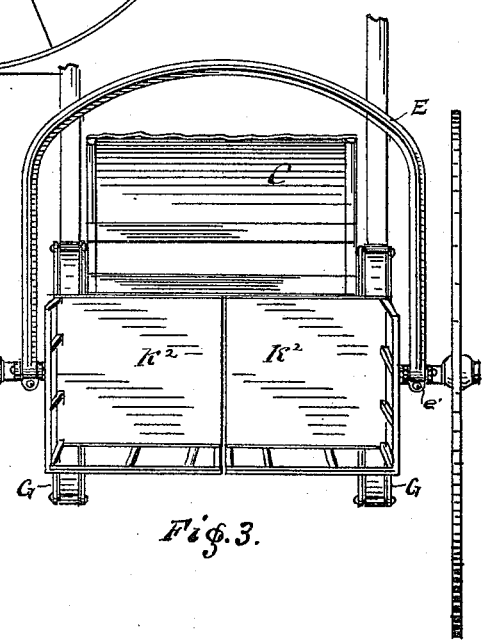
Figure 4:
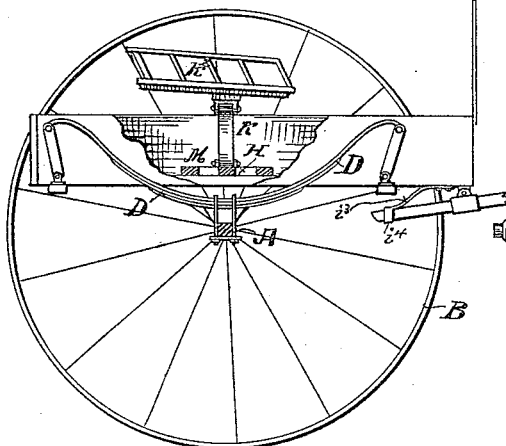
Figure 5:
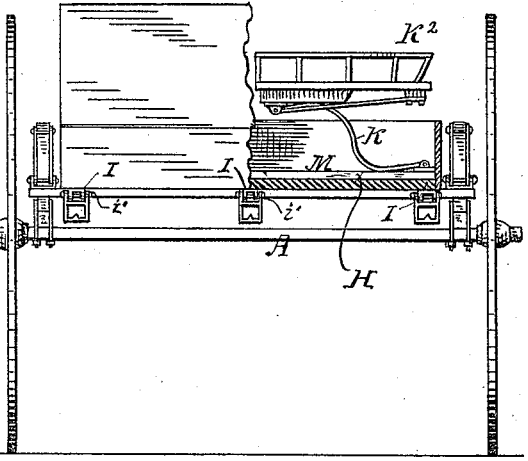
Figure 6:
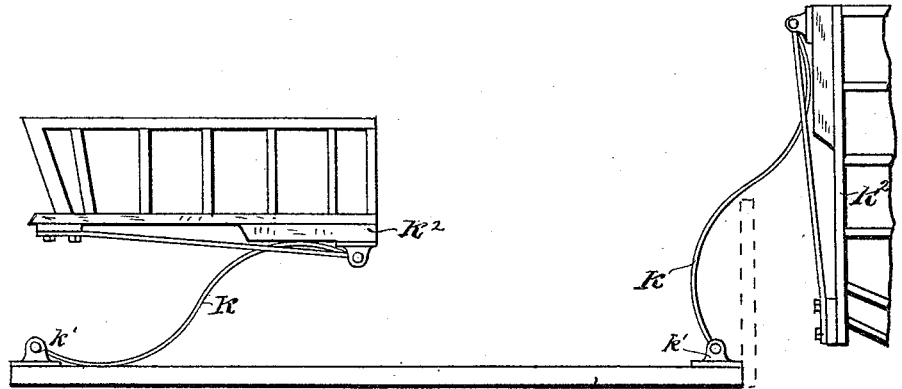

Figure 1 represents in side elevation, partly in section, a two-wheeled vehicle or road-cart constructed substantially in accordance with my invention; Fig. 2, a rear elevation of the same; Fig. 3, a plan view; Fig. 4, a side elevation showing a box-like body; Fig. 5, a front view of the same, parts being broken away; and Fig. 6, a detail in side elevation of the movable frame and connected seats.

In the drawings, A represents the axle, B the wheels, C the foot-rack, and D the springs, which are and may be of any suitable construction.

Secured to the axle at each side near the wheels is an arched frame or sweep E, which will preferably be constructed of T-iron or other suitable-shaped metal, it extending from one side forward, where it is bent U-shaped around and secured to the axle at the opposite side, said arched frame being preferably pivoted at its ends between ears on a plate $e'$, secured to the axle at its upper face, a brace $e^2$ being secured to a similar plate beneath the axle and bolted to the arched frame, as clearly shown in Fig. 1.

The springs D, which will preferably be elliptical, but which may, if desired, be semi-elliptical, are clipped to the axle—one at each side centrally—and extend longitudinally with relation to the cart, and the foot-rack or body—whichever is used—will be supported by links F G, pivoted to the front and rear ends of the springs.

It is preferable to connect the body or foot-rack at its front and back portions to the front and rear ends of the springs by the swinging links to thereby form an elastic and self-leveling connection for the foot-rack or body; but, if desired, the said foot-rack may be connected to the springs only in front and be connected at the rear end to the cross-piece H, extending transversely across from spring to spring in a line central with relation to the axle.

I do not desire to limit myself to a foot-rack such as shown in the drawings, as a box-like body might be used, if desired, without departing from my invention.

Formed upon or secured to the arched frame are three shaft or pole holders, herein shown as plates I, having depending ears $i'$ to extend down each side of the shaft or pole, through which are formed eyes to receive a pin or bolt that extends through the shaft or pole or a plate secured thereto to form a pivotal connection. The object of having a series of these plates I is to permit shafts and poles to be interchanged when desired, such construction permitting the ready removal of one and the substitution of another. When shafts are used, which necessarily are straight at the heel, their rear ends are extended through between the ears of plates I at the sides and are pivoted thereto by a bolt, and the extreme ends are extended between the links F, that depend from the forward ends of the springs D, whereby any oscillating movement of the shafts is compensated for by the said springs D. If a pole is used, it is similarly secured to the central plate I and is extended through the foot-rack, where it is engaged by a vertically-yielding spring $i^3$, secured to the foot-rack or body, a cap $i^4$ on said spring encircling the end of said pole, which spring permits the pole to oscillate at its extreme end to obviate the transmission of horse motion to the vehicle seat and body.

Pivoted to the upper side of the cross-bar H at $k'$—one at each side or end—is an S-shaped spring K, which is also preferably pivoted at its upper end to a seat $K'$, there being one seat to each spring, the spring being preferably pivoted to each seat near its inner edge, whereby the spring and seat may be turned to one side to permit the ingress or egress of persons at the back of the vehicle.

It is obvious that one continuous seat might be employed instead of a divided seat and be arranged so as to be turned sidewise, and also that a series of springs might be employed with each seat. When using the said seat with a box-like body, which will be supported directly upon the longitudinal springs or hung by links, as shown in Fig. 4 of the drawings, the springs K will preferably be pivoted to an oblong frame M, which will rest loosely between the sides of the body, and may be moved longitudinally to balance the seat with relation to the body, and the cross-piece H be dispensed with. This construction of seat is applicable to various kinds of vehicles. Therefore I do not desire to limit myself to its use with carts or two-wheeled vehicles.

As will be noticed by reference to the drawings, the springs which support the two seats bear upon the cross-piece H and against the under side of each seat, thereby forming not only a movable seat, but a very easy-riding one, and rendering the spring automatically conformable to varying weights applied to the seat—to wit, the width of bearing at both ends of the springs being increased proportionate to the depression of the seat.

If a body is used instead of a foot-rack, as shown in Fig. 5, the shafts or pole will each extend through loops pivoted to the body at a point remote from the end of the shaft, and the end of the shaft or pole will be secured movably or otherwise to a spring secured to the under side of the body to permit oscillation of the shaft at the end.

I claim—

1. In a two-wheeled vehicle, the springs D, secured upon the axle, as shown, the foot-rack or body hung to the ends of said springs by the links F G, the cross-piece H, supported upon said springs, and the two half-seats $K'$, secured to the independent springs K, pivoted to the cross-piece H, so that the seats may be turned sidewise to permit ingress of persons from the rear, substantially as described.

2. In a vehicle, the seat $K'$ and a cross-bar or frame, in combination with the S-shaped springs K, pivoted to the cross-bar or frame and pivotally or otherwise secured to the seat and having a long horizontal bearing against the cross-bar or frame and against the under side of the seat, substantially as shown and described.

In testimony whereof I affix my signature in presence of two witnesses.

CHAS. COMSTOCK.

Witnesses:
N. E. C. WHITNEY,
JOSEPH A. MINTURN.